(12) United States Patent
Kuo

(10) Patent No.: US 6,555,939 B1
(45) Date of Patent: Apr. 29, 2003

(54) STRUCTURE FOR A HIGH EFFICIENCY DC MOTOR

(76) Inventor: Yi-Yu Kuo, No.11, Alley 9, Lane 799, Junghua Road, Toufen Jen, Miaoli Hsien (TW)

( * ) Notice: Subject to any disclaimer, the term of this patent is extended or adjusted under 35 U.S.C. 154(b) by 0 days.

(21) Appl. No.: 10/166,391

(22) Filed: Jun. 11, 2002

(51) Int. Cl.[7] .............................................. H02K 13/08
(52) U.S. Cl. ..................................................... 310/128
(58) Field of Search .............................. 310/233, 137, 310/236, 224, 128, 136

(56) References Cited

U.S. PATENT DOCUMENTS

| | | | | |
|---|---|---|---|---|
| 2,655,613 A | * | 10/1953 | Wieseman | 310/194 |
| 4,975,612 A | * | 12/1990 | Strobl | 310/234 |
| 5,798,625 A | * | 8/1998 | Tanii et al. | 318/541 |
| 6,166,468 A | * | 12/2000 | Suzuki et al. | 310/90 |

* cited by examiner

Primary Examiner—Tran Nguyen
Assistant Examiner—Heba Yousri Elkassabgi
(74) Attorney, Agent, or Firm—Dennison, Schultz & Dougherty

(57) ABSTRACT

An improved structure for a high efficiency DC motor is disclosed. The DC motor is a motor with built-in field windings, its center shaft is set up in a non-ferromagnetic base which has three equally spaced confinement slots formed around its outer peripheral surface for installing three stacks of laminated silicon steel sheets, a field winding is wound over each laminated silicon steel sheet stack thereby forming a three split phase DC motor. A control unit composed of a commutator assembly and a hollow stationary base is connected in cascade with the motor field so as to drive and control the motor operation. A plurality of motors can be connected in cascade on a common center shaft to form a bulk motor unit operated by one control unit.

4 Claims, 6 Drawing Sheets

STRUCTURE FOR A HIGH EFFICIENCY DC MOTOR

BACKGROUND OF THE INVENTION

1. Field of the Invention

The present invention related to an improved structure for a high efficiency DC motor, in particular, to an improved structure for a high output DC motor with built-in field windings.

2. Description of the Prior Art

A conventional DC motor is essentially composed of a rotor and a stator. The rotor consists of a moving armature core with the armature windings thereon, several brushes and commutators, while the stator consists of several magnetic poles with field windings, several interpoles, a bracket, a yoke, and a housing. A rotating torque is produced in the rotor to rotate it when input current is fed into the armature windings according to fleming's left hand law. However, there are some inherent shortcomings with a conventional DC motor constructed as such, i,e. worn out of the commutators and brushes due to sparks and abrasion by a large load current which further causes great machine noise and vibration. In addition to this, the armature windings enclosed in the stator cause bad heat dissipation which is further aggravated by insufficient spacing available for installation of the windings.

The above disadvantages greatly restrict efficiency and applicable field of the conventional DC motors that motor manufactures are eager to eliminate.

In view of the above situation, the inventor of the present invention herein conducted intensive research based on many years experience gained through professional engagement in the manufacturing of related products, with continuous experimentation and improvement culminating in the development of the improved structure for a high efficiency DC motor of this invention.

SUMMARY OF THE INVENTION

It is an object of the present invention to provide an improved structure for a DC motor with merits of a low starting current, a light weight armature, reduced brush abrasion, good heat dissipation effect, long life and high efficiency by constructing the motor with a non-ferromagnetic base having an anisotropic ferromagnet and a hermetically sealed center shaft installed therein, and en externally connected control unit.

It is another object of the present invention to provide an improved structure for a DC motor with an externally connected brush structure so as to reduce the wearing of commutators and brushes due to sparks thereby minimizing noise and vibration when the machine operates.

It is a further object of the present invention to provide an improved structure for a DC motor to expose the field windings for facilitating heat dissipation and extending available spacing for windings.

It is one more object of the present invention to provide an improved structure for a DC motor which can be cascade controlled along with a power amplification circuit so as to easily control the motor's rotational direction, and is able to increase the total power output by connecting several motors in series.

For achieving the aforementioned objects, the DC motor of the present invention is provided with a non-ferromagnetic base having an anisotropic ferromagnet and a center shaft installed thereon. Three equally spaced confinement slots are formed around the outer peripheral surface of the non-ferromagnetic base for stacking up laminated silicon steel sheets serving as cores for the field windings thus forming a three split phase with built-in field structured DC motor.

The control unit is composed of a commutator assembly and a hollow stationary base. The commutator assembly further includes a hollow tube body, a center shaft, three commutator segments and three metal rings. The center shaft is an extended portion of the motor shaft which is passing the hollow tube body and supported at the end terminal, while all three commutator segments and metal rings are secured onto the hollow tube body, and then connected each other with conductors. There are two power supply brushes and three output brushes equipped on the hollow base such that the commutator segments and the metal rings are able to align with their corresponding power supply brushes and output brushes when the commutator assembly is set up in the hollow stationary base. With this structure, the motor can be powerfully driven at desired direction by conjoining the control unit with the main motor on the center shaft.

BRIEF DESCRIPTION OF THE DRAWINGS

For fuller understanding of the nature, features and objects of the present invention, reference should be made to the following detailed description taken in conjunction with the accompanying drawings in which.

DETAILED DESCRIPTION OF THE PREFERRED EMBODIMENT

The DC motor of the present invention is a high efficiency DC motor with build-in field windings associated with an externally connected control unit.

Figure 1:
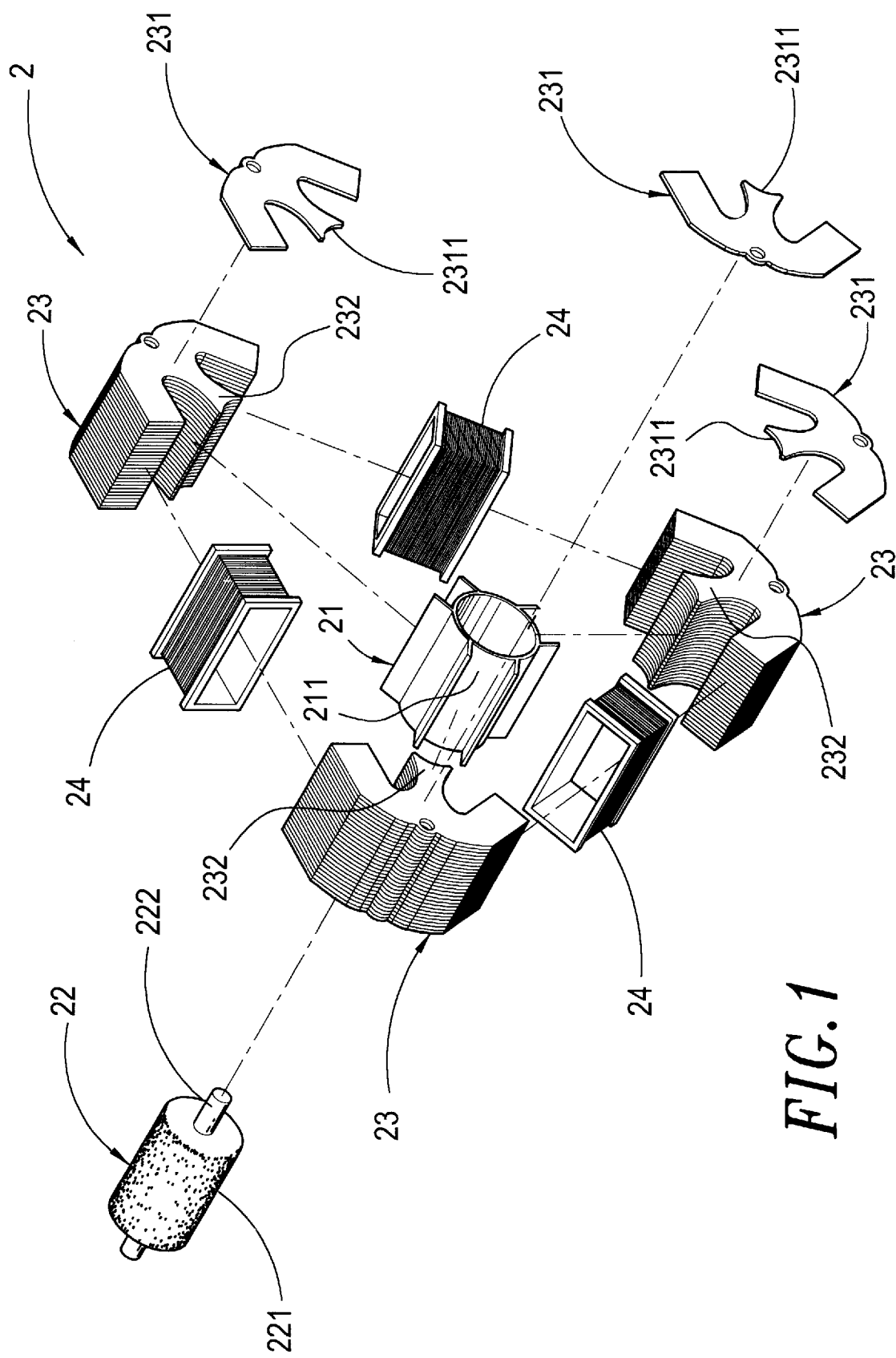
FIG. 1 is an exploded illustrative view of the DC motor according to the present invention.
Figure 2:
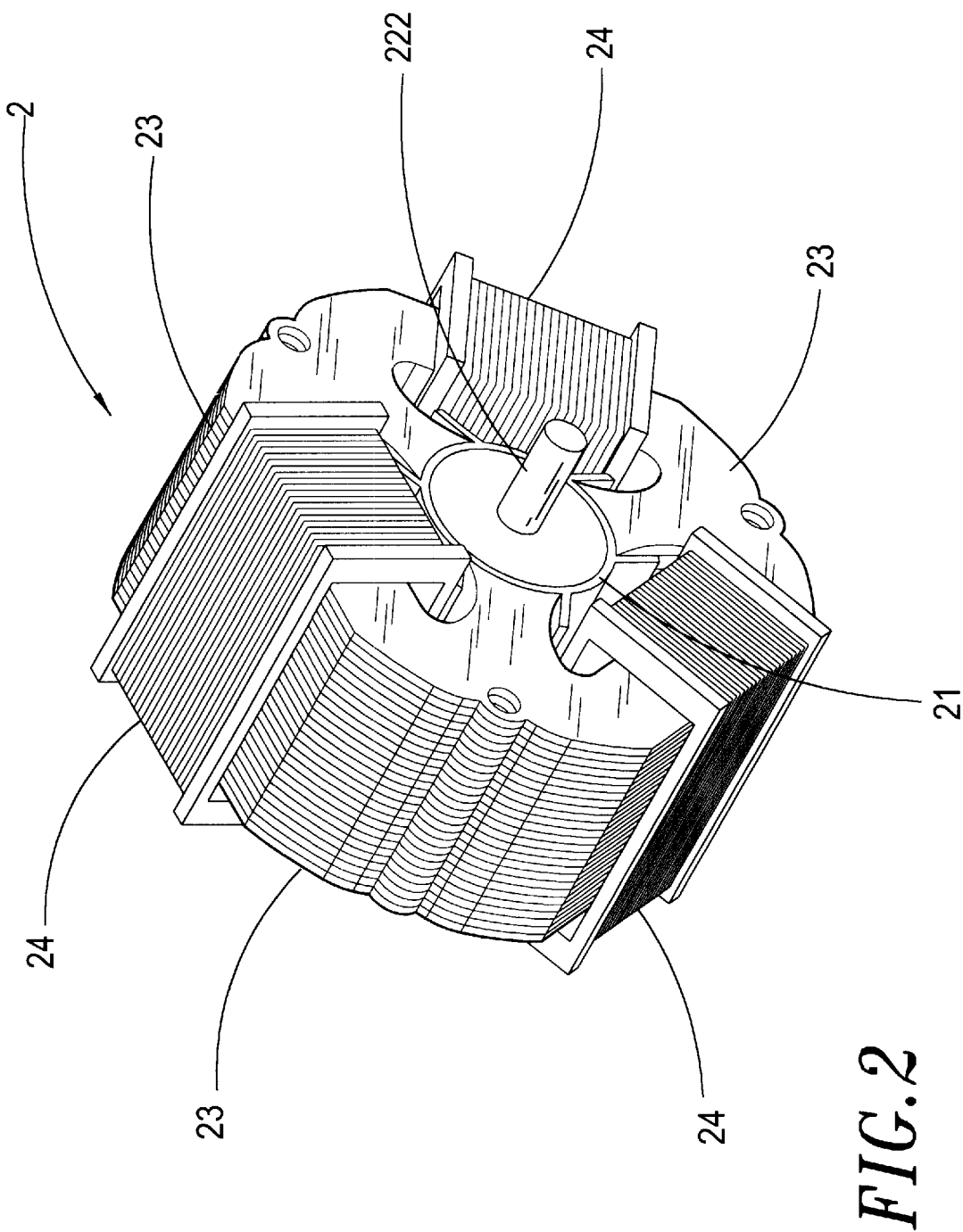
FIG. 2 is a three dimensional view of the DC motor according to the present invention.

Referring to FIG. 1 and FIG. 2, which show an exploded illustrative view and the three dimensional view of the DC motor according to the present invention respectively, it is observed from the above mentioned figures that the DC motor 2 essentially comprises: a non-ferromagnetic base 21 with three equally spaced confinement slots 211 formed around the outer peripheral surface thereof, a center shaft 22 composed of an annular magnet 221 and a driving shaft 222 passing through the center of the magnet 221 and emerging from both ends of the magnet 221, the driving shat 222 is extended to a control unit of the motor which will be described below and three stacks 23 of laminated silicon steel sheets 231 on three confinement slots 211, the steel sheet 231 has three teeth configurated in 3 letter like shape, a plurality of middle teeth 2311 forms a stub 232 at the middle portion of the stacks 23 of laminated silicon steel sheets 231.

After the center shaft 22 is set up in the base 21 with the driving shaft 222 poking through the center of the magnet 221 and emerging from both ends of the magnet 221 each of three stubs 232 is inlaid into its respective confinement slot 211 formed on the base 21 such that stacks 23 of silicon steel sheets and the base 21 are formed as if integrally. A field winding 24 is enclosed over each joint portion of the adjacent stacks 23 thereby forming a DC motor 2 with built-in field windings.

Figure 3:
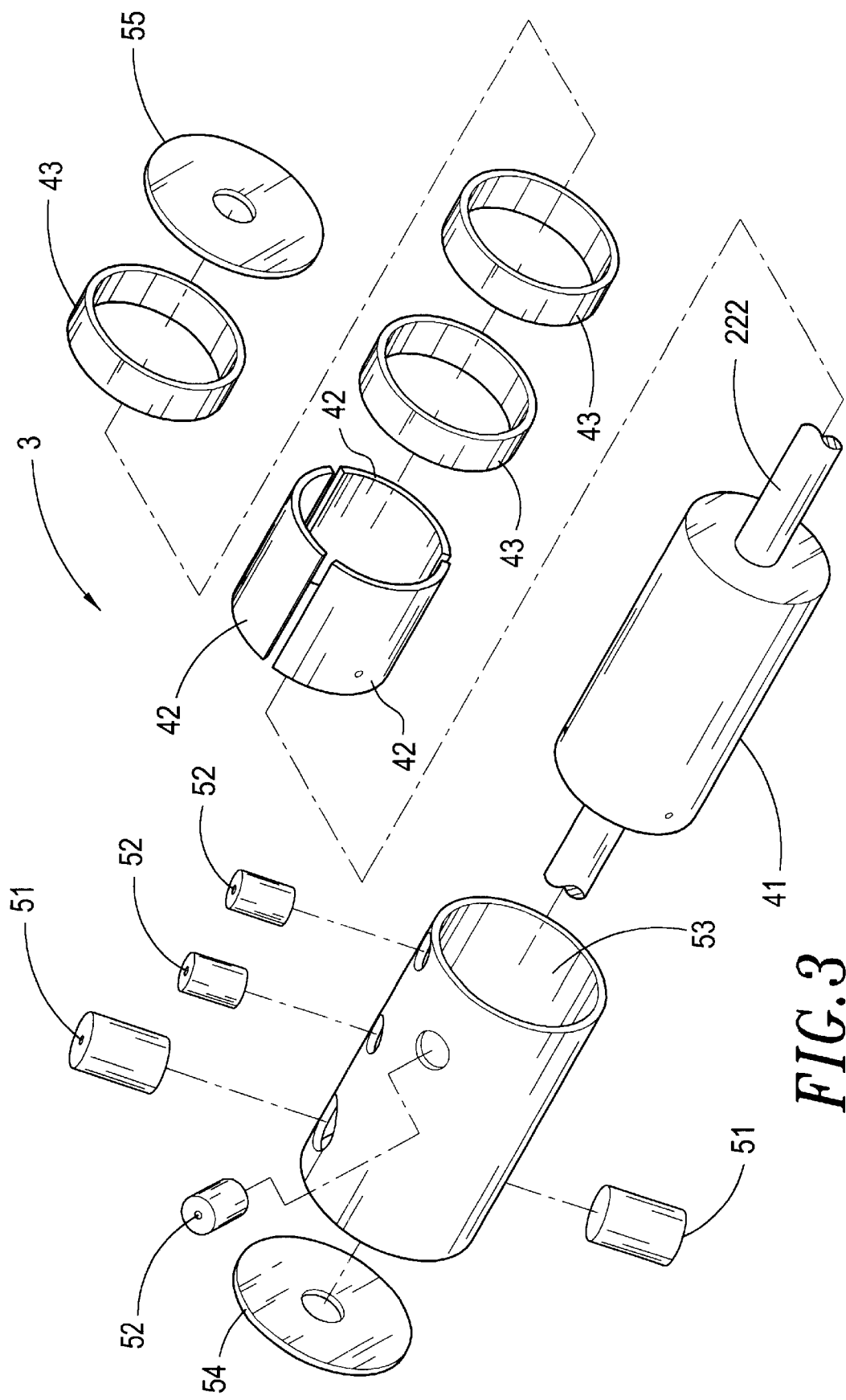
FIG. 3 is an exploded illustrative view of the control unit for the DC motor of the present invention.
Figure 4:
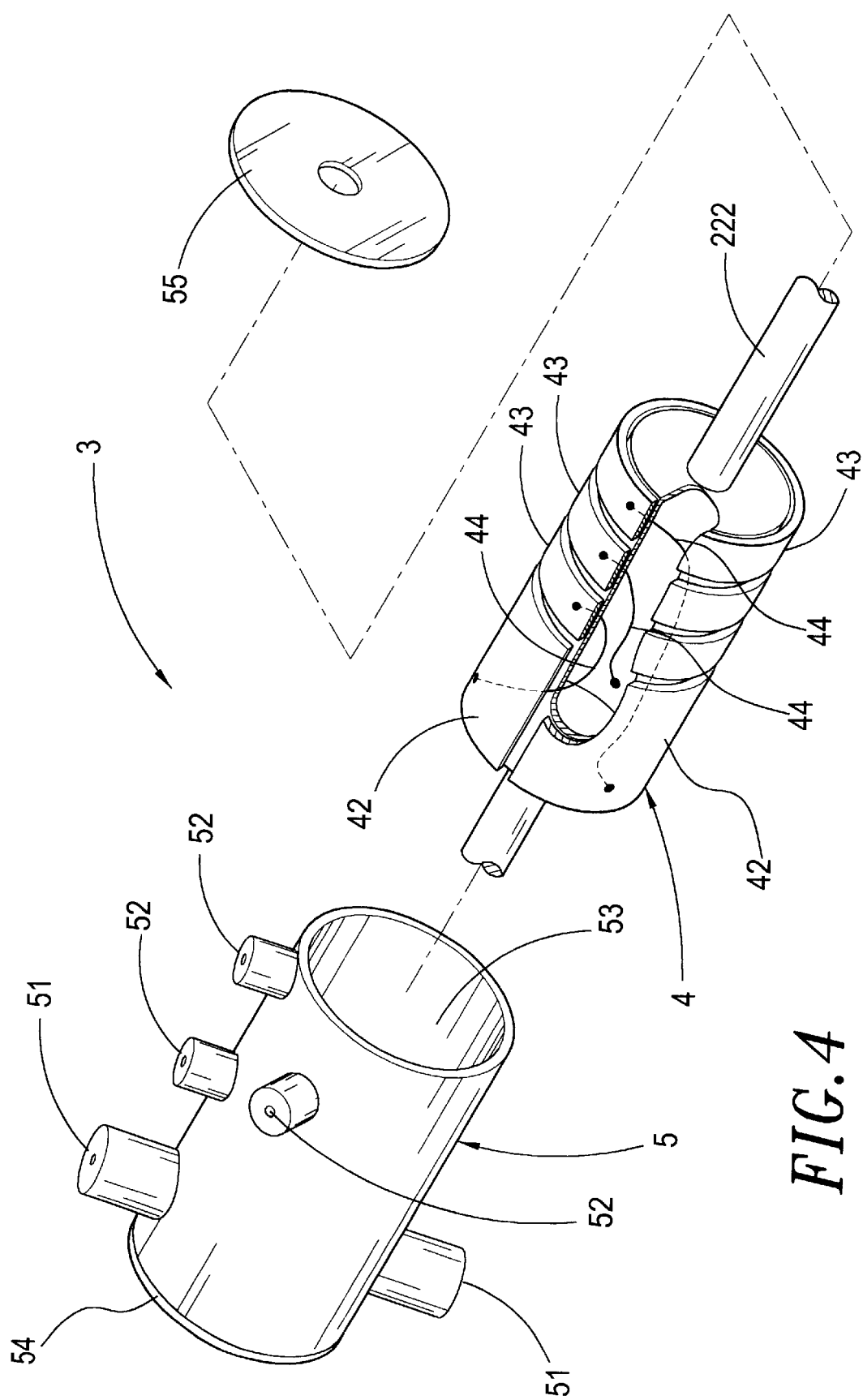
FIG. 4 is a partial exploded illustrative view of the control unit for the DC motor of the present invention.

Referring to FIG. 3 and FIG. 4, the drawings show the whole and partial exploded views of the control unit respectively. It can be seen from the drawing the control unit 3 is essentially composed of a commutator assembly 4 and a hollow stationary base 5. The commutator assembly 4 includes a hollow tube body 41, a center shaft 222, three commutator segments 42 and three metal rings 43. Here, the center shaft 222 is an extended portion of the aforementioned center shaft 222 of the motor 2 and is supported by the base after penetrating through the hollow tube body 41 on which three commutator segments 42 and three metal rings 43 are secured. And then the commutator segments 42 and metal rings 43 are connected each other with conductors 44.

The hollow stationary base 5 is a hollow tube body having two power supply brushes 51 and three output brushes 52 attached thereon. The inner hollow cavity 53 of the base 5 is for receiving the commutator assembly 4. The commutator segments 42 and the metal rings 43 can be aligned with their corresponding power supply brushes 51 and output brushes 52 when the commutator assembly 4 is set up in the inner hollow cavity 53. By such a arrangement the three commutator segments 42 can be brought to contact the two power supply brushes 51 in order, while three output brushes 52 can be brought to contact their corresponding metal rings 43. Afterwards the whole control unit 3 is enclosed with a front cover 54 and a rear cover 55 and the commutator assembly 4 is rotatable in the hollow stationary base 5. The control unit 3 composed of the commutator assembly 4 and the hollow stationary base 5 can deliver an output current to drive the motor 2.

Figure 5:
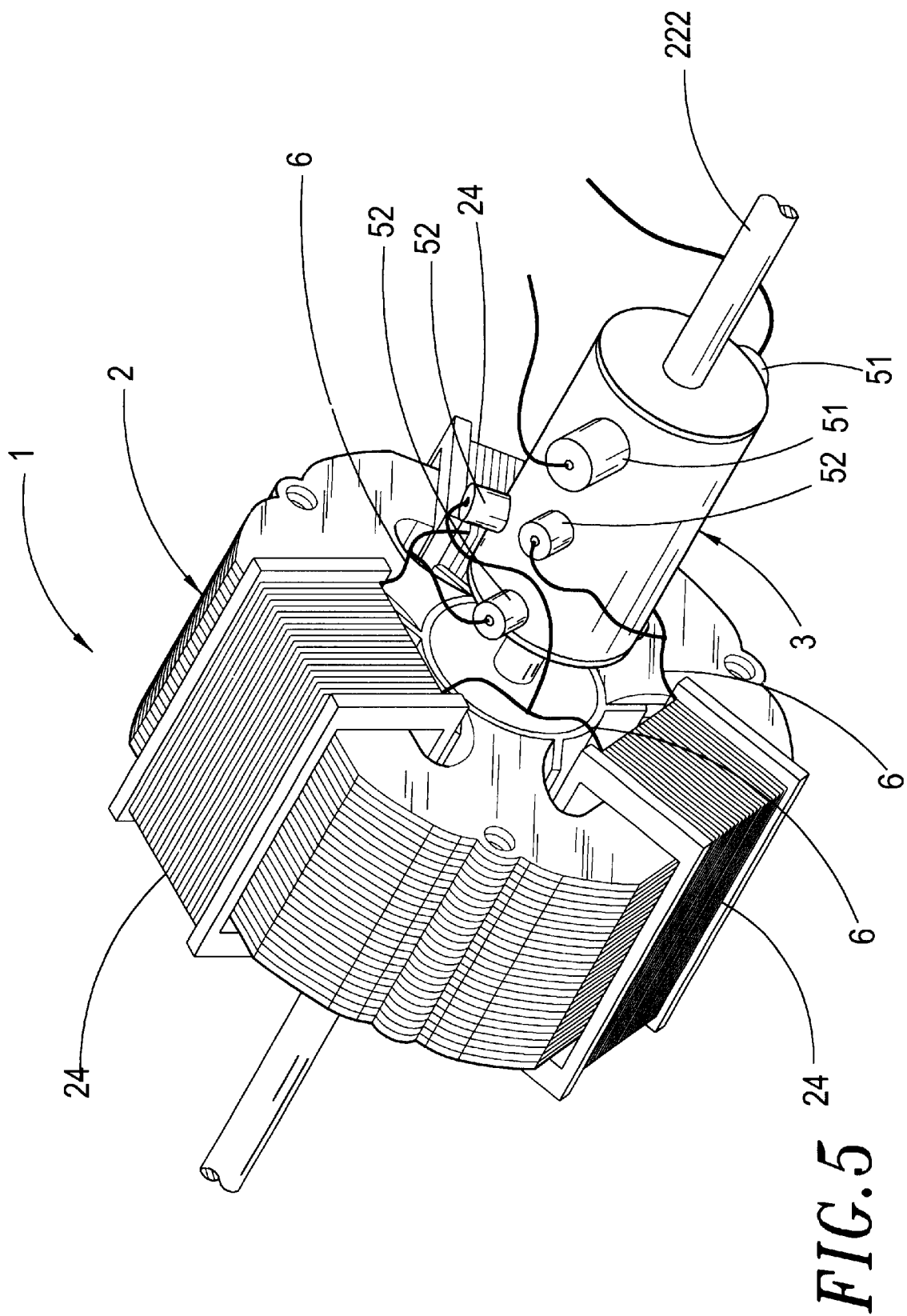
FIG. 5 is a schematic view of the DC motor in an embodiment of the present invention.

Referring to FIG. 5 which is a schematic view of an embodiment of the present invention, it shows that the motor 2 and the control unit are conjoined with the common center shaft 222 with three field windings 24 of the motor 2 connected in series with a signal wire 6. The signal wire 6 is tapped off from each midpoint of wire sections bridging two adjacent field windings 24 and connected to each corresponding output brush 52, while the power supply brushes 51 draw in the power source so that the motor 2 is driven by the control unit 3 in any direction. Several motors 2 with built-in field windings can be connected in cascade on the center shaft 222 to form a bulk motor unit 1 so as to augment the power output by operating a single control unit 3.

Figure 6:
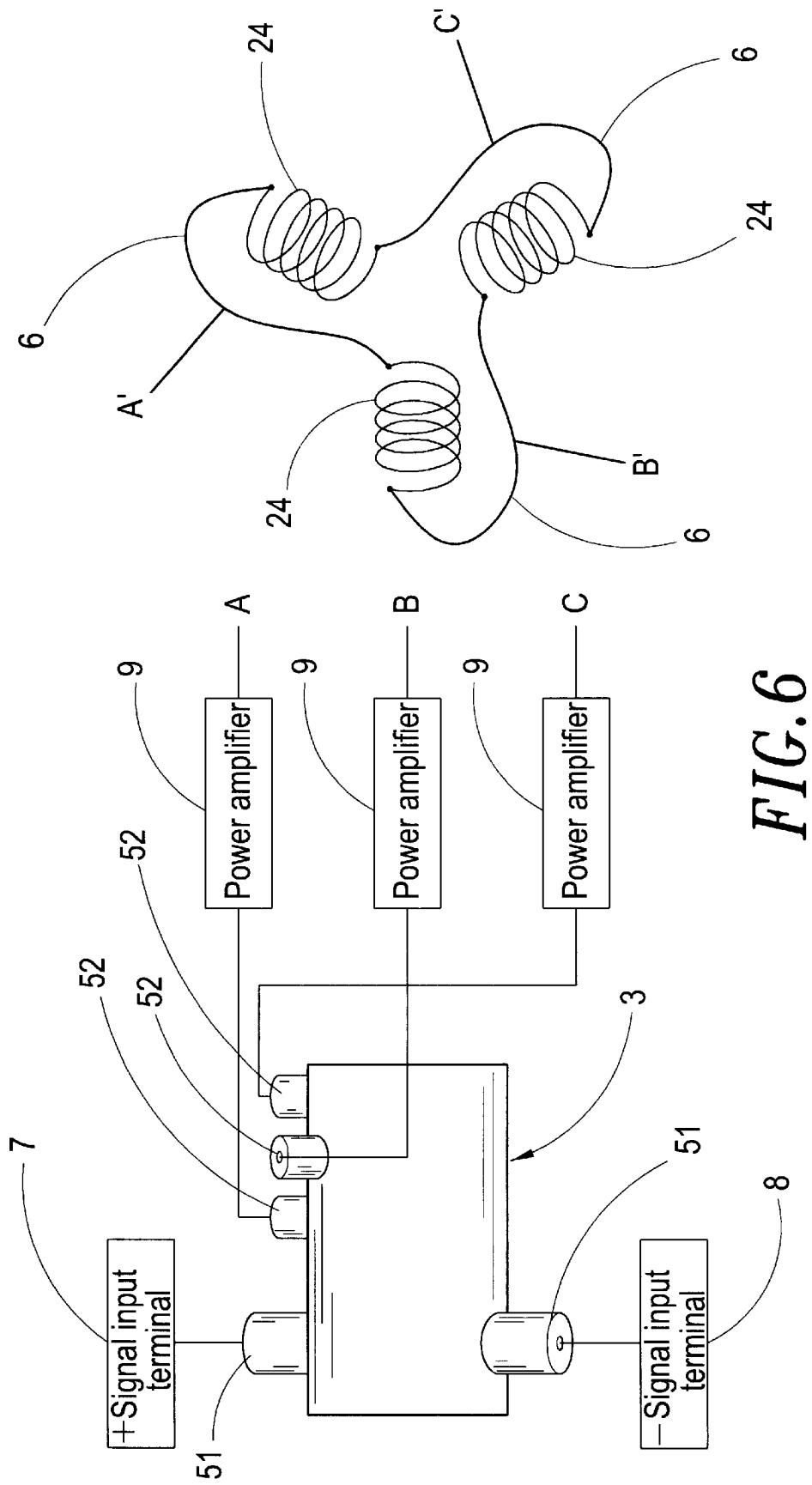
FIG. 6 is an illustrative view showing electrical connection for cascade field operation of the motor according to the present invention.

FIG. 6 shows an illustrative view about electrical connection for cascade operation of the motor 2 according to the present invention. As shown in FIG. 6, three field windings 24 are connected in series with the signal wire 6. A branch is tapped off from the midway nodes A', B', C' of three signal wire sections bridging each two adjacent field windings 24. The two power supply brushes 51 are respectively connected to a + signal input terminal 7 and a− signal input terminal 8. The terminals A, B, C of the three output brushes 52 are connected to corresponding midway nodes A', B', C' of three signal wire sections. Meanwhile a power amplifier 9 may be inserted therebetween to augment the motor power output if necessary.

It is understood from the above description that the present invention has several noteworthy advantages, in particular:

1. Hermetically sealed center shalt structure, an external control unit, exposed field windings all these features contribute to enabling the DC motor of the present invention to reduce brush and commutator abrasion, minimize machine noise that results in improving the motor efficiency and prolonging motor life.
2. The novel and unique structure of the present invention makes it possible for cascade controlling the motor to operate in either direction with a desired speed by associating with power amplifiers, or increasing the total power output by connecting several motors in series.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. Improved structure for a high efficiency DC motor comprising:

a DC motor with built-in field windings, a center shaft of said motor having an annular magnet is set up in a non-ferromagnetic base, which has three equally spaced confinement slots formed around the outer peripheral surface thereof for installing three stacks of laminated silicon steel sheets, a field winding is wound around each said laminated silicon steel sheet stack thereby forming a three split phase DC motor with built-in field windings;

a control unit composed of a commutator assembly and a hollow stationary base, said commutator assembly including a hollow tube body, a center shaft, three commutator segments, and three metal rings, said center shaft is an extended portion of said motor center shaft which is supported by said base after penetrating through said hollow tube body on which said three commutator segments and said three metal rings are secured, then said commutator segments and said metal rings are connected each other with conductors, said hollow stationary base has two power supply brushes and three output brushes attached thereon in the version that said commutator segments and said metal rings can be aligned with their corresponding power supply brushes and said output brushes when said commutator assembly is set up in said hollow stationary base;

said motor and said control unit are conjoined with said common center shaft with three field windings of said motor 2 connected in series with a signal wire, said signal wire is tapped off from each midpoint of its wire sections bridging two adjacent field windings and then connected to each corresponding output brush, and said two power supply brushes are connected to the power source so that said motor can be driven by said control unit in any direction.

2. The improved structure for a high efficiency DC motor of claim 1, wherein said control unit is operated in a cascade control scheme, wherein said three built-in field windings are connected in series with a signal wire, then said signal wire is tapped off from each midpoint of its wire sections bridging two adjacent windings and then connected to each corresponding output brush, while said two power supply brushes are connected to a+ signal input terminal and a− signal input terminal respectively.

3. The improved structure for a high efficiency DC motor of claim 2, wherein a power amplifier circuit is added to said control unit if necessary.

4. The improved structure for a high efficiency DC motor of claim 1, wherein a plurality of said motors is connected in cascade on said center shaft to form a bulk motor unit so as to augment the power output by operating one control unit.

* * * * *